(12) United States Patent
Peng (10) Patent No.: US 11,684,195 B2
(45) Date of Patent: Jun. 27, 2023

(54) LID BODY AND COOKER

(71) Applicant: Foshan Shunde Midea Electrical Heating Appliances Manufacturing Co., Ltd., Foshan (CN)

(72) Inventor: Feng Peng, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 455 days.

(21) Appl. No.: 16/833,030

(22) Filed: Mar. 27, 2020

(65) Prior Publication Data
US 2020/0221895 A1 Jul. 16, 2020

Related U.S. Application Data

(63) Continuation of application No. PCT/CN2017/108984, filed on Nov. 1, 2017.

(30) Foreign Application Priority Data

Sep. 29, 2017 (CN) .......................... 201721272683.1
Sep. 29, 2017 (CN) .......................... 201721276569.6

(51) Int. Cl.
*A47J 27/08* (2006.01)
*A47J 31/44* (2006.01)
*A47J 36/06* (2006.01)

(52) U.S. Cl.
CPC ........... *A47J 27/08* (2013.01); *A47J 27/0802* (2013.01); *A47J 31/4407* (2013.01); *A47J 36/06* (2013.01)

(58) Field of Classification Search
CPC ........ A47J 27/08; A47J 27/0802; A47J 36/06; A47J 31/4407

(Continued)

(56) References Cited

U.S. PATENT DOCUMENTS

2015/0128714 A1* 5/2015 Moss .................... G01L 5/0052
73/726
2016/0001615 A1* 1/2016 Arai .................... B60C 23/0498
73/146.5

(Continued)

FOREIGN PATENT DOCUMENTS

CN 2751714 Y 1/2006
CN 2808015 Y 8/2006

(Continued)

OTHER PUBLICATIONS

Foshan Shunde Midea Electrical Heating Appliances Manufacturing Co. Ltd., International Search Report and Written Opinion, PCT/CN2017/108984, dated Jun. 25, 2018, 10 pgs.

(Continued)

*Primary Examiner* — Nhat Chieu Q Do
(74) *Attorney, Agent, or Firm* — Morgan, Lewis & Bockius LLP (57) ABSTRACT

A lid body is provided with a lid body wireless transmission device. The lid body wireless transmission device includes a circuit board. The lid body is provided with a mounting cavity for mounting the circuit board, one side of the mounting cavity being open. The circuit board is fixedly mounted in the mounting cavity; moreover, the mounting cavity is potted by means of a potting adhesive and the opening is sealed. The circuit board is potted in the mounting cavity by means of the potting adhesive, so that the circuit board is completely isolated from a cavity in the lid body to ensure that the circuit board does not contact high-temperature steam in the lid body, thereby preventing the occurrence of excessive temperature rise of a component due to that the circuit board contacts high-temperature steam and the occurrence of damages to the circuit board.

9 Claims, 9 Drawing Sheets

(58) Field of Classification Search
USPC .................................................... 220/573.1
See application file for complete search history.

(56) References Cited

U.S. PATENT DOCUMENTS

2016/0174378 A1* 6/2016 Johnson ................. H05K 1/148
29/830
2019/0008310 A1* 1/2019 Kim .................... A47J 27/0813

FOREIGN PATENT DOCUMENTS

| CN | 204427688 U | | 7/2015 |
|----|-------------|---|--------|
| CN | 204970797 U | * | 1/2016 |
| CN | 206371949 U | | 8/2017 |
| CN | 206414164 | | 8/2017 |
| CN | 107149409 A | | 9/2017 |
| JP | H06-133856 A | | 5/1994 |
| JP | 2003070630 A | | 3/2003 |

OTHER PUBLICATIONS

Foshan Shunde Midea Electrical Heating Appliances Manufacturing Co. Ltd., Communication Pursuant to Rules 70(2) and 70a(2), EP17927029.3, dated Aug. 18, 2020, 1 pg.
Foshan Shunde Midea Electrical Heating Appliances Manufacturing Co. Ltd., Extended European Search Report, EP17927029.3, dated Jul. 29, 2020, 8 pgs.

* cited by examiner

LID BODY AND COOKER

RELATED APPLICATIONS

This application is a continuation of PCT Application PCT/CN2017/108984, filed on Nov. 1, 2017 which claims priority to Chinese Patent Application No. 201721276569.6, filed with the Chinese Patent Office on Sep. 29, 2017 and entitled "LID BODY AND COOKER", and Chinese Patent Application No. 201721272683.1, filed with the Chinese Patent Office on Sep. 29, 2017 and entitled "LID BODY AND COOKER", the entire contents of the above are herein incorporated by reference.

FIELD

The present disclosure relates to the field of cookers, and particularly relates to a lid body and a cooker comprising the lid body.

BACKGROUND

When a pressure cooker is in normal operation, slight air leakage often occurs at the exhaust valve core and the float, and high-temperature steam will be injected in the interior of the lid body after the air leakage, which will result in relatively high air temperature and humidity in the interior of the lid body. For a split-type pressure cooker having a wireless transmission function, a circuit board needs to be mounted in the interior of the lid body, in the existing product structure solution, the lid body is provided with a cavity at a position close to the top, the circuit board is horizontally arranged in the cavity, a sealing ring is then fitted at the opening position of the cavity, and finally a cover is designed to press the sealing ring so that the circuit board is sealed in the cavity. However, the sealing ring is prone to aging under the conditions of high temperature and high humidity, the aging of the sealing ring will make it impossible for the cavity in which the circuit board is mounted to be completely sealed, and when air leakage occurs to the product, high-temperature and high-humidity steam will be injected into the cavity, resulting in excessive temperature rise of the circuit board or directly resulting in damages to the circuit board. Therefore, there is much room for improvement in the existing product structure solution.

SUMMARY

The present disclosure aims to solve at least one of the technical problems existing in the prior art.

To this end, one object of the present disclosure is to provide a lid body capable of preventing excessive temperature rise of a circuit board.

The other object of the present disclosure is to provide a cooker comprising the lid body.

In order to achieve the objects, an embodiment of the first aspect of the present disclosure provides a lid body, wherein the lid body is provided with a lid body wireless transmission device, the lid body wireless transmission device comprises a circuit board, the lid body is provided with a mounting cavity for mounting the circuit board, and has an opening on one side of the mounting cavity, the circuit board is fixedly mounted in the mounting cavity, and the mounting cavity is potted by means of a potting adhesive and the opening is sealed.

In the solution, the circuit board is potted in the mounting cavity by means of the potting adhesive, so that the circuit board is completely isolated from a cavity in the lid body to ensure that the circuit board does not contact high-temperature steam in the lid body, thereby preventing the occurrence of excessive temperature rise of a component due to that the circuit board contacts high-temperature steam or the occurrence of damages to the circuit board.

In any of the above-described technical solutions, optionally, a receiving cavity with an opening facing downward is provided on a lower surface of a top wall of the lid body, the opening of the receiving cavity is lower than the lower surface of the top wall of the lid body, and the mounting cavity is wholly or partially inserted into the receiving cavity.

In the solution, a receiving cavity with an opening facing downward is provided on the lower surface of the top wall of the lid body, an exhaust valve and a float on the lid body are mounted outside the receiving cavity, and the mounting cavity in which the circuit board is mounted is at least partially inserted into the receiving cavity. When air leakage occurs at the position of the exhaust valve and the float, high-temperature steam will rise and accumulate below the top wall of the lid body, since the opening of the receiving cavity is lower than the lower surface of the top wall of the lid body, the high-temperature steam cannot flow laterally into the receiving cavity, and only the air having a relatively low temperature at the bottom of the lid body can enter the interior of the receiving cavity from the opening at the bottom of the receiving cavity, and come into contact with the mounting cavity, which can reduce the temperature rise of the mounting cavity, thus reducing the temperature rise of the circuit board in the mounting cavity and preventing excessive temperature rise of the components on the circuit board.

In any of the above-described technical solutions, optionally, the lid body comprises a pot lid and a surface lid, the surface lid comprises a surface lid top wall and a surface lid side wall extending downwardly from an edge of the surface lid top wall, the surface lid covers the pot lid inside, the surface lid top wall is provided with a stopping rib extending downwardly, and two sides of the stopping rib are respectively connected with the surface lid side wall, so that the receiving cavity is formed between the stopping rib and the surface lid side wall.

In the solution, the lower surface of the surface lid top wall is provided with a stopping rib, and the two sides of the stopping rib are connected with the surface lid side wall to form the receiving cavity. When air leakage occurs at the position of the exhaust valve and the float, high-temperature steam will accumulate below the surface lid top wall, due to the blocking of the stopping rib, the high-temperature steam cannot flow laterally into the receiving cavity, and only the air having a relatively low temperature at the bottom of the lid body can enter the interior of the receiving cavity from the opening at the bottom of the receiving cavity, and come into contact with the mounting cavity, which can reduce the temperature rise of the mounting cavity, thus reducing the temperature rise of the circuit board in the mounting cavity and preventing excessive temperature rise of the components on the circuit board.

Optionally, the lid body further comprises an inner lid, the mounting cavity is provided on the inner lid, the pot lid comprises a pot lid top wall and a pot lid side wall extending downwardly from an edge of the pot lid top wall, the inner lid is sleeved on an outer side of the pot lid side wall, the surface lid side wall is fixedly connected to the inner lid, and the surface lid covers the pot lid and the inner lid inside.

In the solution, the mounting cavity is provided on the inner lid, and the circuit board is hermetically mounted in the mounting cavity of the inner lid, and the design of inserting the inner lid mounting cavity into the surface lid receiving cavity reduces the temperature of the mounting cavity, thereby reducing the temperature rise of the circuit board in the mounting cavity, and preventing excessive temperature rise of the components on the circuit board.

Optionally, the lid body further comprises a mounting box, the mounting cavity is provided in the mounting box, and the mounting box is fixedly mounted between the surface lid and the pot lid.

In the solution, a separate part, i.e., the mounting box, is designed for mounting the circuit board, the circuit board is hermetically mounted in the inner lid mounting box, and the design of inserting the mounting box into the surface lid receiving cavity reduces the temperature of the mounting cavity, thereby reducing the temperature rise of the circuit board in the mounting cavity, and preventing excessive temperature rise of the components on the circuit board.

In any of the above-described technical solutions, optionally, the mounting cavity comprises a protruding portion protruding towards the center of the pot lid, and the receiving cavity is provided with an opening corresponding to the protruding portion.

In any of the above-described technical solutions, optionally, the circuit board is vertically mounted in the mounting cavity.

In any of the above-described technical solutions, optionally, a component having a relatively low temperature resistance and a component having a relatively high temperature resistance are mounted on the circuit board, and the component having a relatively high temperature resistance is mounted above the component having a relatively low temperature resistance.

In the solution, the circuit board is vertically mounted in the mounting cavity, since the density of hot air is lower than the density of cold air, when steam leaks from the exhaust valve position and the float position, high-temperature steam will rise, more steam comes into contact with the top cavity wall of the mounting cavity and the contact time is longer, resulting in a higher temperature rise at the top of the circuit board than at the bottom of the circuit board. Therefore, at the time of mounting the components, the component having a relatively low temperature resistance is mounted close to the bottom of the circuit board, and the component having a relatively high temperature resistance is mounted above the component having a relatively low temperature resistance, thereby reducing the temperature rise of the component having a relatively low temperature resistance, and preventing excessive temperature rise of the component having a relatively low temperature resistance.

In any of the above-described technical solutions, optionally, the top end of the mounting cavity has an opening. This design facilitates the potting operation.

In any of the above-described technical solutions, optionally, the circuit board is mounted in the mounting cavity, and the minimum distance between the highest end surface of the circuit board and an upper end surface of the mounting cavity is 3 mm.

If the potting adhesive at the opening position of the mounting cavity is too thin, the sealing property of the mounting cavity will be affected, and for this reason, in this solution, the top end of the circuit board is made to be at least 3 mm lower than the top end of the mounting cavity, so that a potting adhesive layer having a thickness of at least 3 mm is formed at the opening position of the mounting cavity, so as to effectively seal the mounting cavity.

In any of the above-described technical solutions, optionally, the mounting cavity is provided at a side portion of the lid body.

Since the density of hot air is lower than the density of cold air, when steam leaks from the exhaust valve position and the float position, high-temperature steam will rise, and by providing the mounting cavity at the side portion of the lid body, it is possible to reduce the amount of steam in contact with the cavity wall of the mounting cavity and the contact time, thereby reducing the temperature rise of the circuit board within the mounting cavity.

In any of the above-described technical solutions, optionally, at least one guide groove is provided in the mounting cavity, and an edge of the circuit board is mated with the guide groove.

At the time of mounting the circuit board, the edge of the circuit board is inserted into the guide groove, and then the circuit board is pushed along the guide groove to slide the circuit board into the mounting cavity. During the mounting process, the guide groove guides the circuit board to reduce the mounting difficulty of the circuit board, and after the circuit board is mounted in place, the guide groove fixes the circuit board to prevent displacement of the circuit board during the potting process.

In the above, optionally, two guide grooves are provided opposite to each other in the mounting cavity, and two side edges of the circuit board are mated with the two guide grooves, respectively. The guide grooves designed in this manner will have good guiding and fixing effects on the circuit board.

In any of the above-described technical solutions, optionally, the potting adhesive includes a two-liquid mixed hardening potting adhesive.

An embodiment of the second aspect of the present disclosure provides a cooker, comprising a lid body as provided in any of the embodiments of the first aspect of the present disclosure and a pot body used in cooperation with the lid body.

The cooker provided by an embodiment of the second aspect of the present disclosure comprises the lid body provided by any of the embodiments of the first aspect of the present disclosure, and therefore the cooker has all the beneficial effects of the lid body provided by any of the above-described embodiments, which will not be further described here.

In the above-described technical solution, the cooker includes a split-type electric pressure cooker, a split-type pressure electric rice cooker or the like.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the following description of embodiments in conjunction with the drawings.

Figure 1:
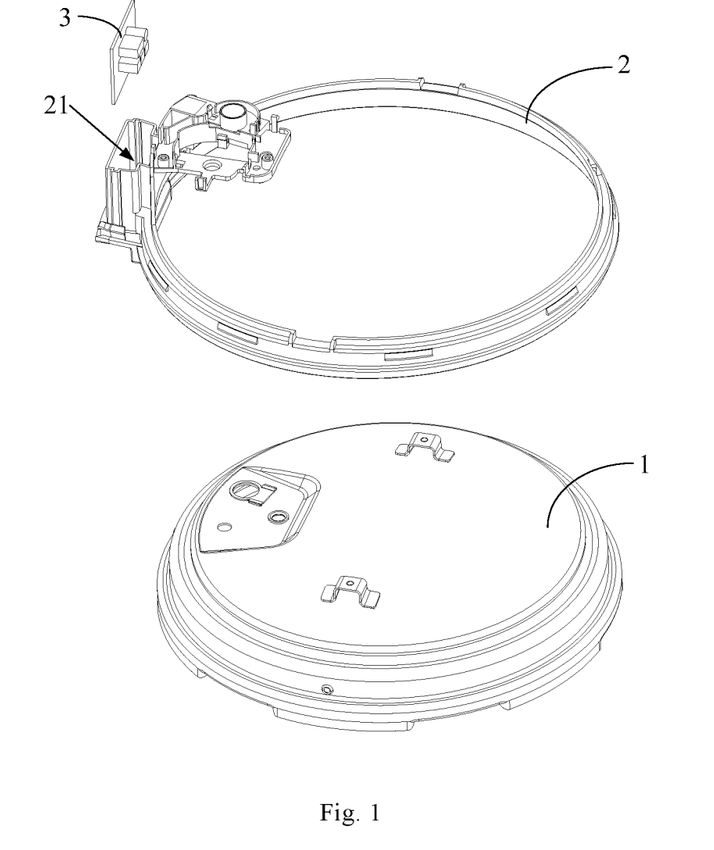
FIG. 1 is an exploded view of a lid body provided by an embodiment of the present disclosure.
Figure 2:
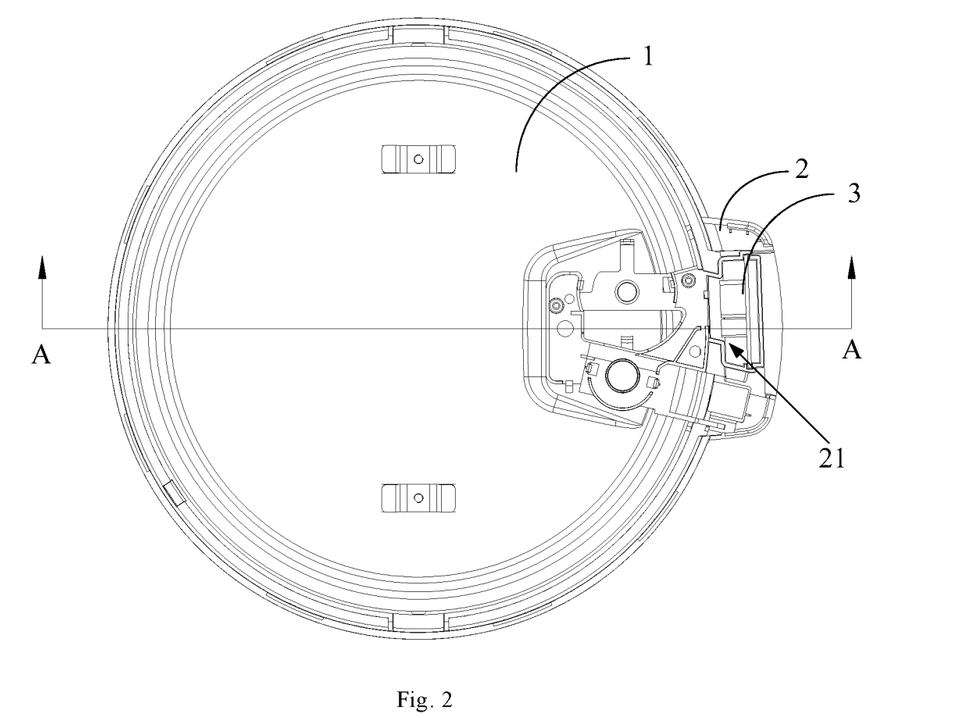
FIG. 2 is a schematic top view of the lid body shown in FIG. 1.
Figure 3:
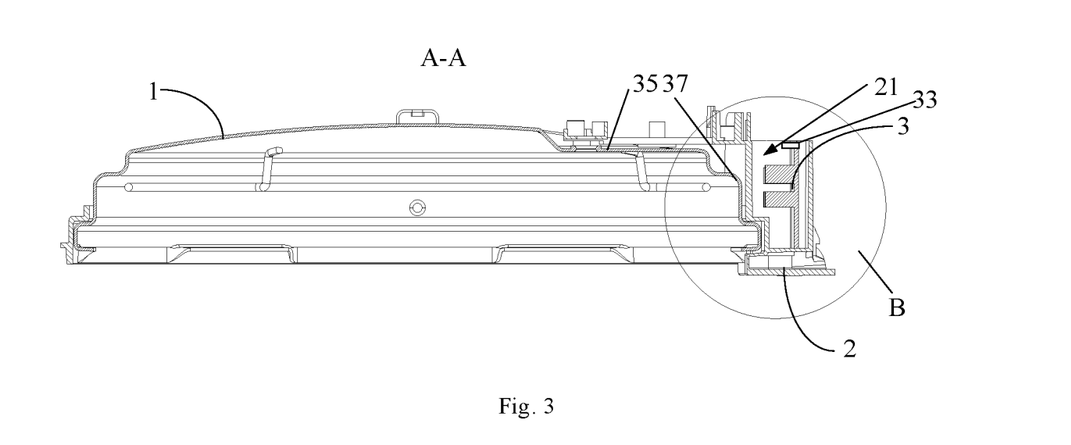
FIG. 3 is a schematic sectional view of the lid body in FIG. 2 in the A-A direction.
Figure 4:
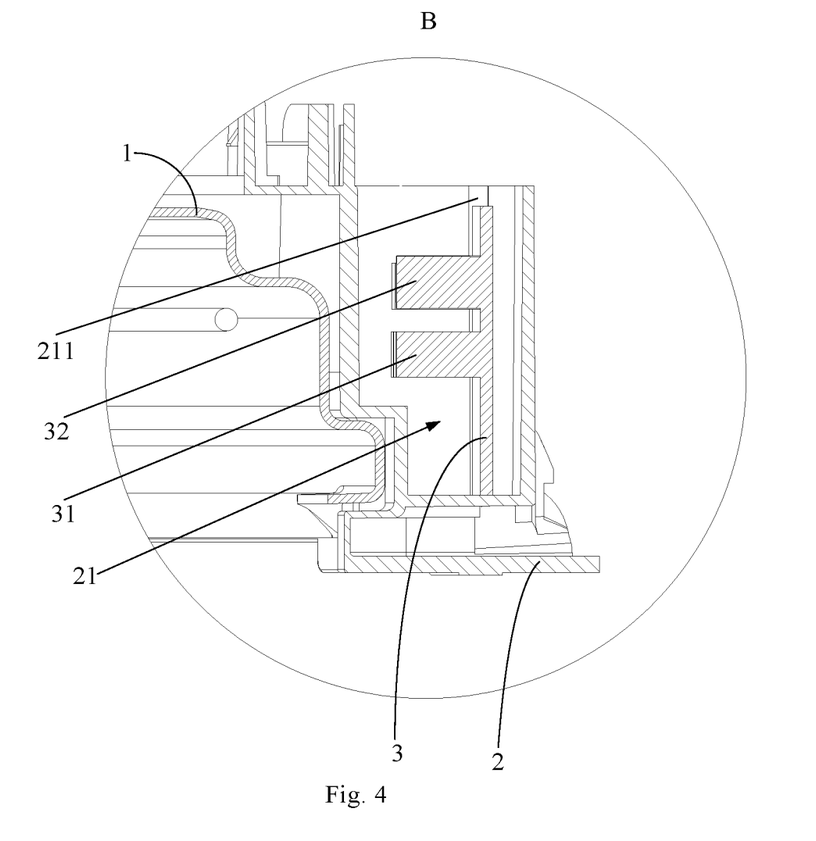
FIG. 4 is an enlarged structural view of part B in FIG. 3.
Figure 5:
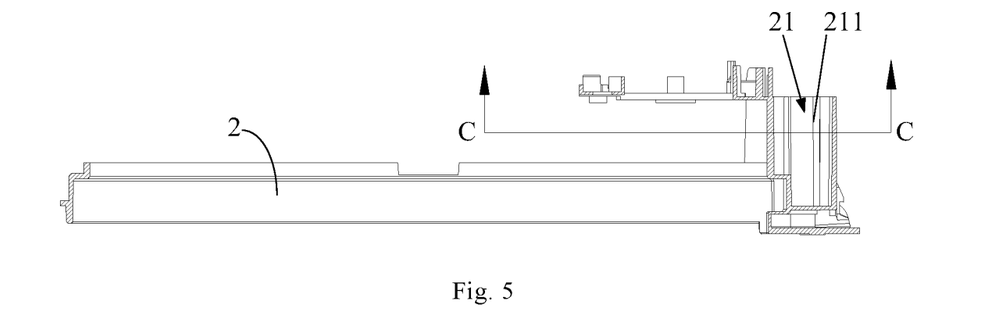
FIG. 5 is a schematic sectional view of an inner lid shown in FIG. 1.
Figure 6:
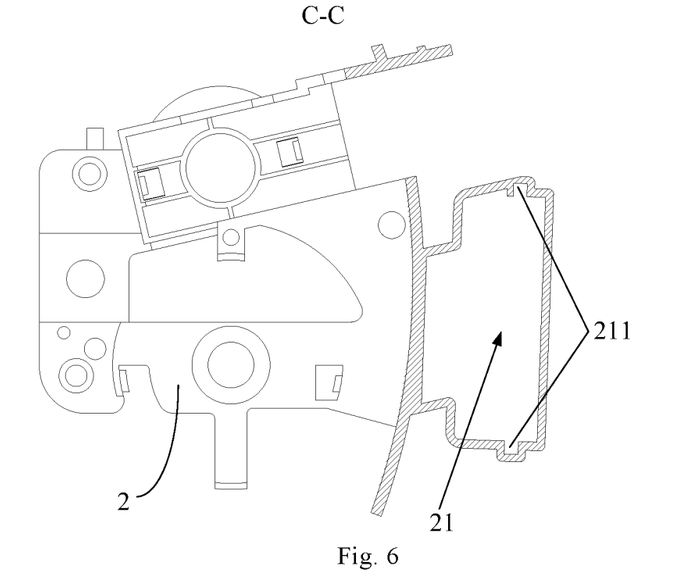
FIG. 6 is a schematic sectional view of the inner lid shown in FIG. 5 in the C-C direction.
Figure 7:
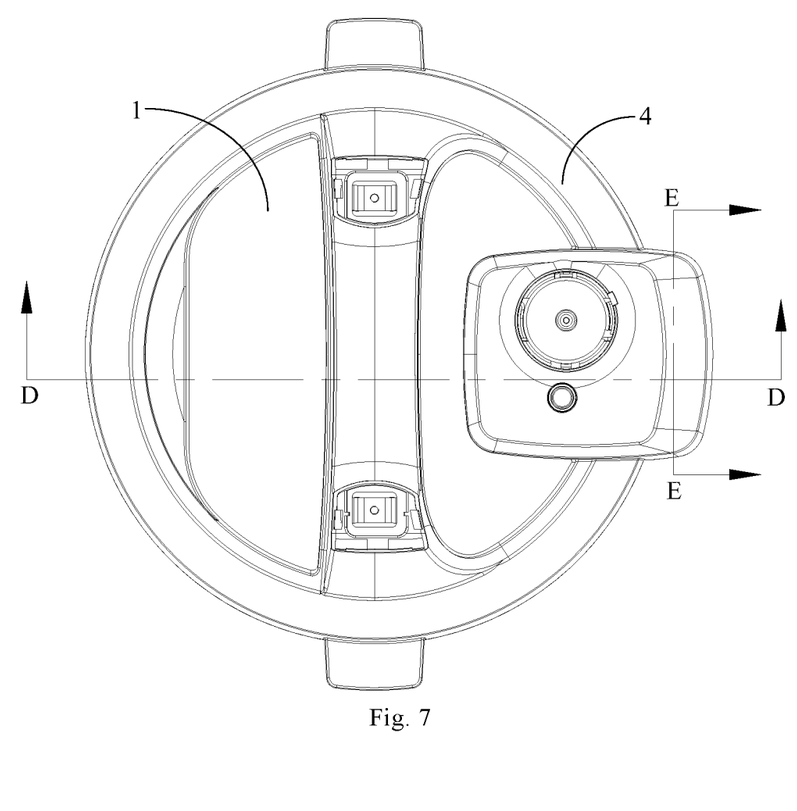
FIG. 7 is a schematic structural view of a lid body provided by another embodiment of the present disclosure.
Figures 8, 9:
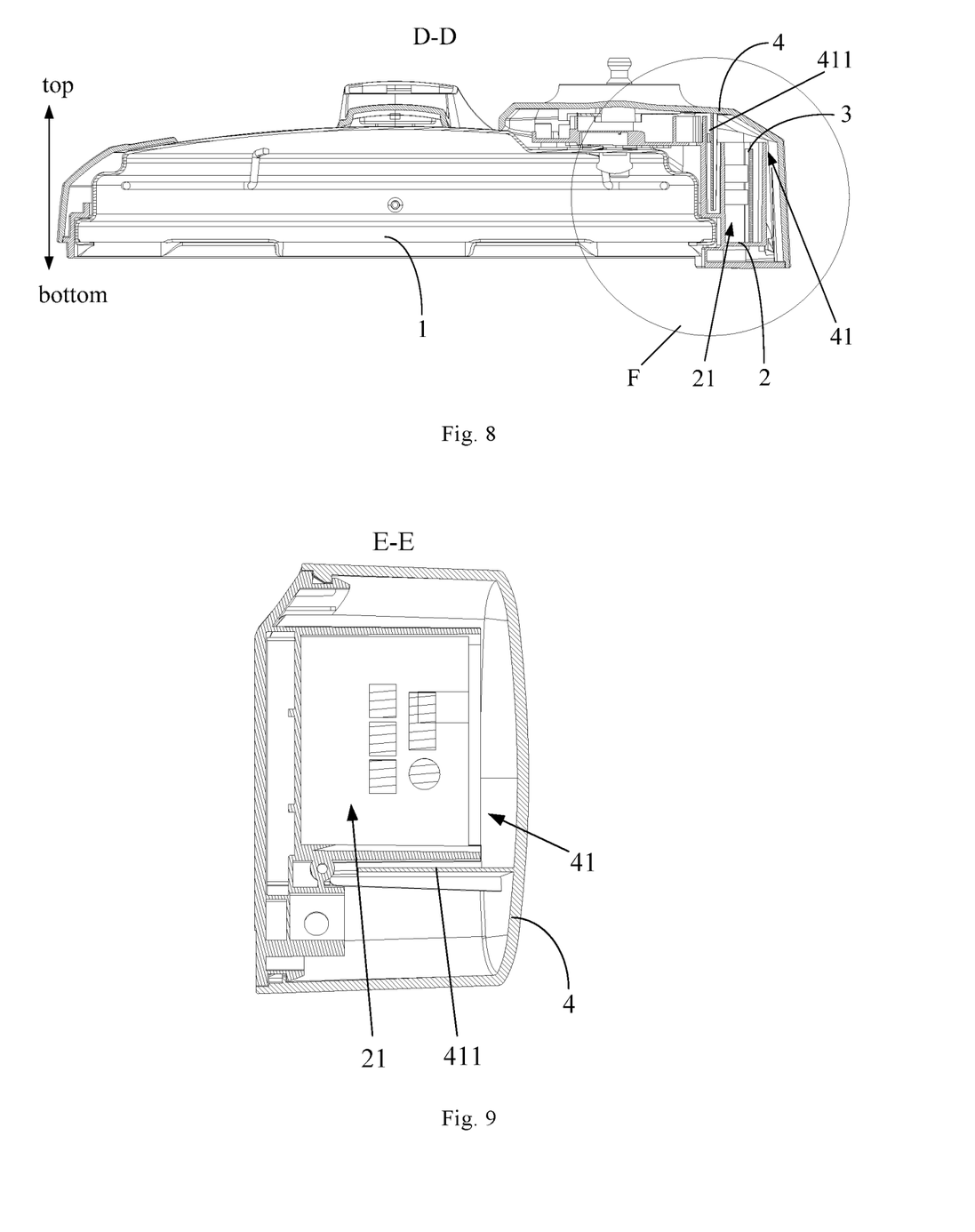
FIG. 8 is a schematic sectional view of the lid body shown in FIG. 7 in the D-D direction.
FIG. 9 is a schematic sectional view of the lid body shown in FIG. 7 in the E-E direction.
Figure 10:
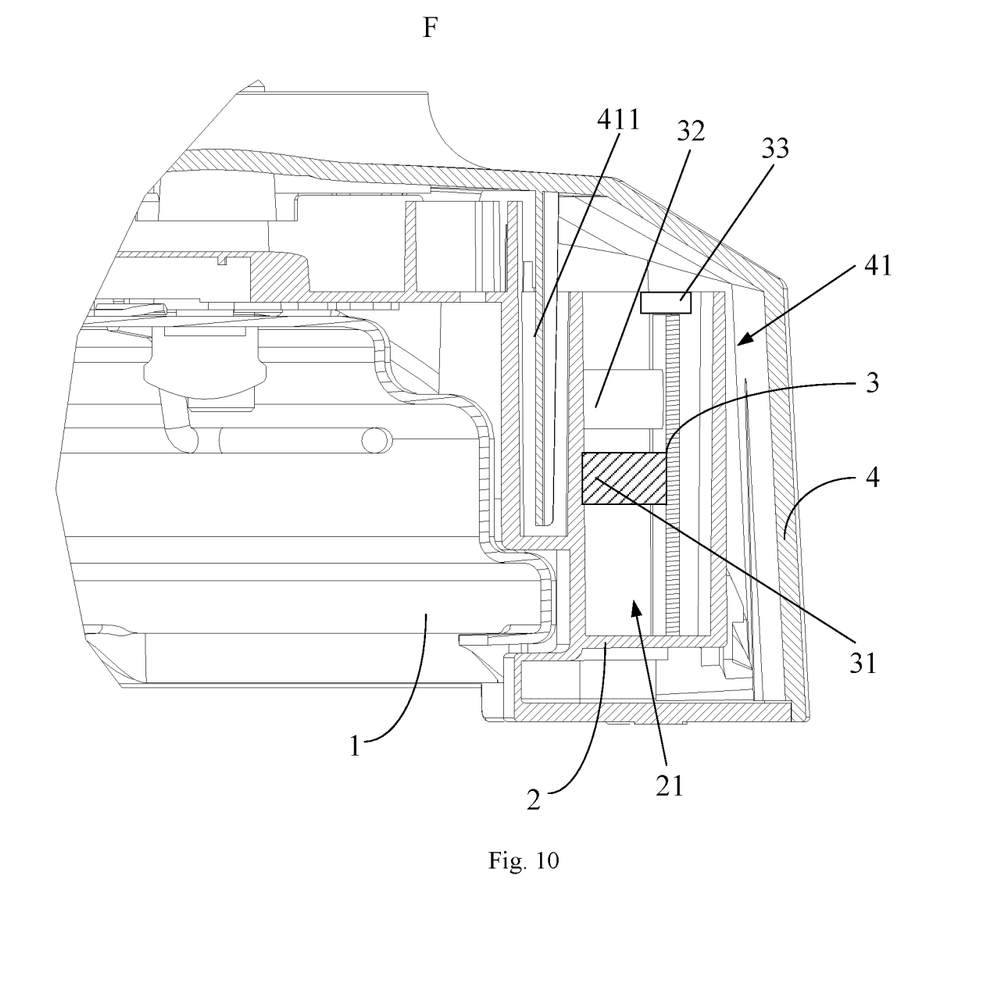
FIG. 10 is an enlarged structural view of part F shown in FIG. 8.
Figure 11:
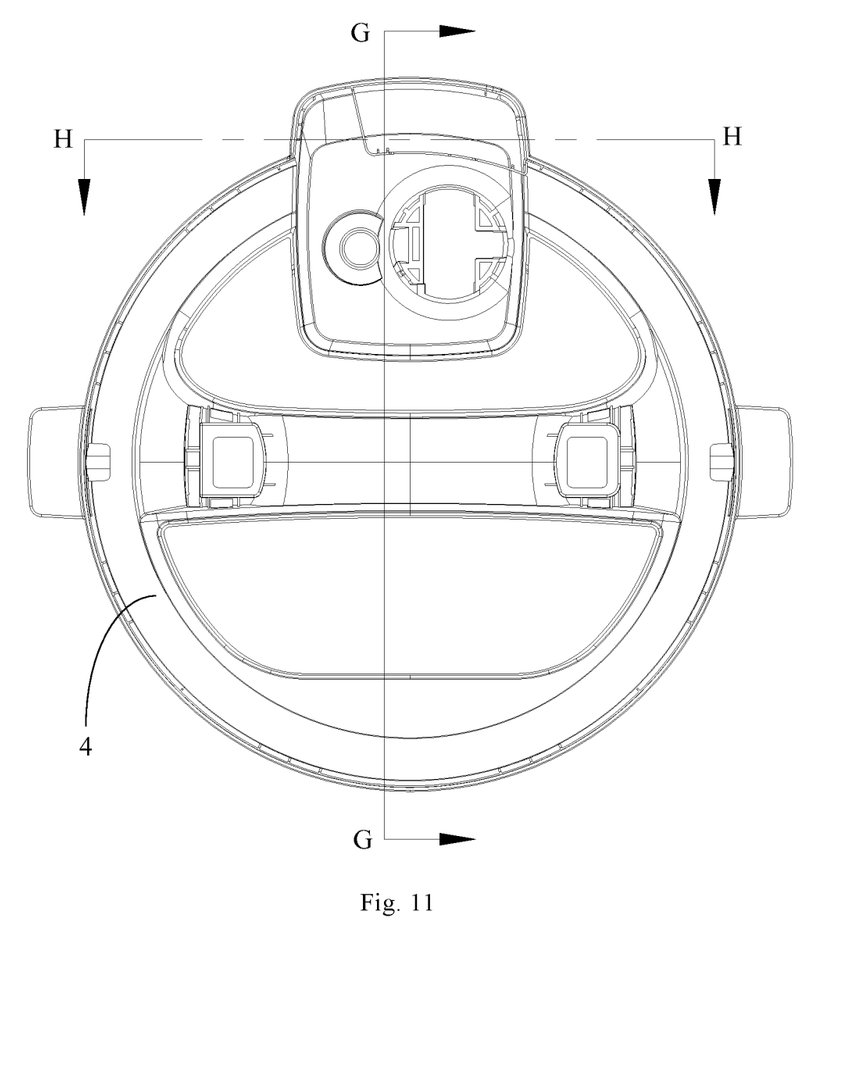
FIG. 11 is a schematic structural view of a surface lid shown in FIG. 7.
Figure 12:
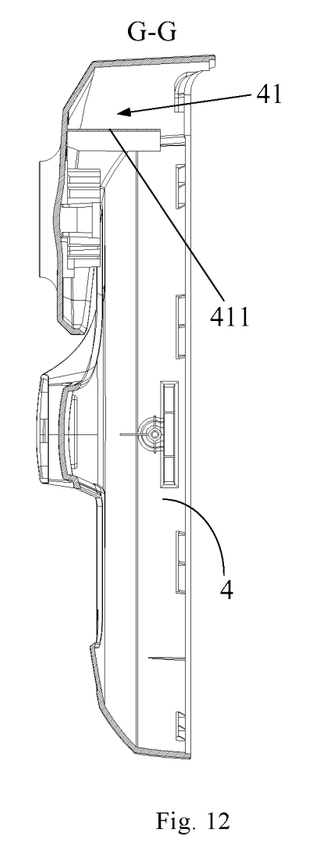
FIG. 12 is a schematic sectional view of the surface lid shown in FIG. 11 in the G-G direction.
Figure 13:
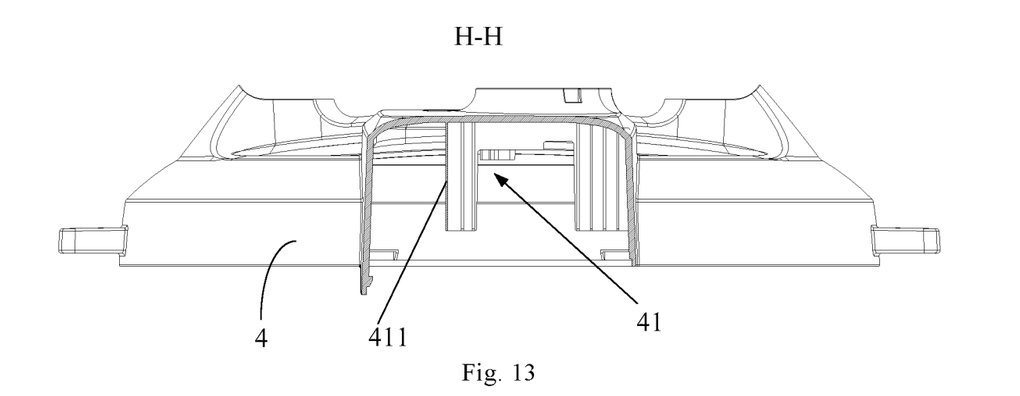
FIG. 13 is a schematic sectional view of the surface lid shown in FIG. 11 in the H-H direction.
Figure 14:
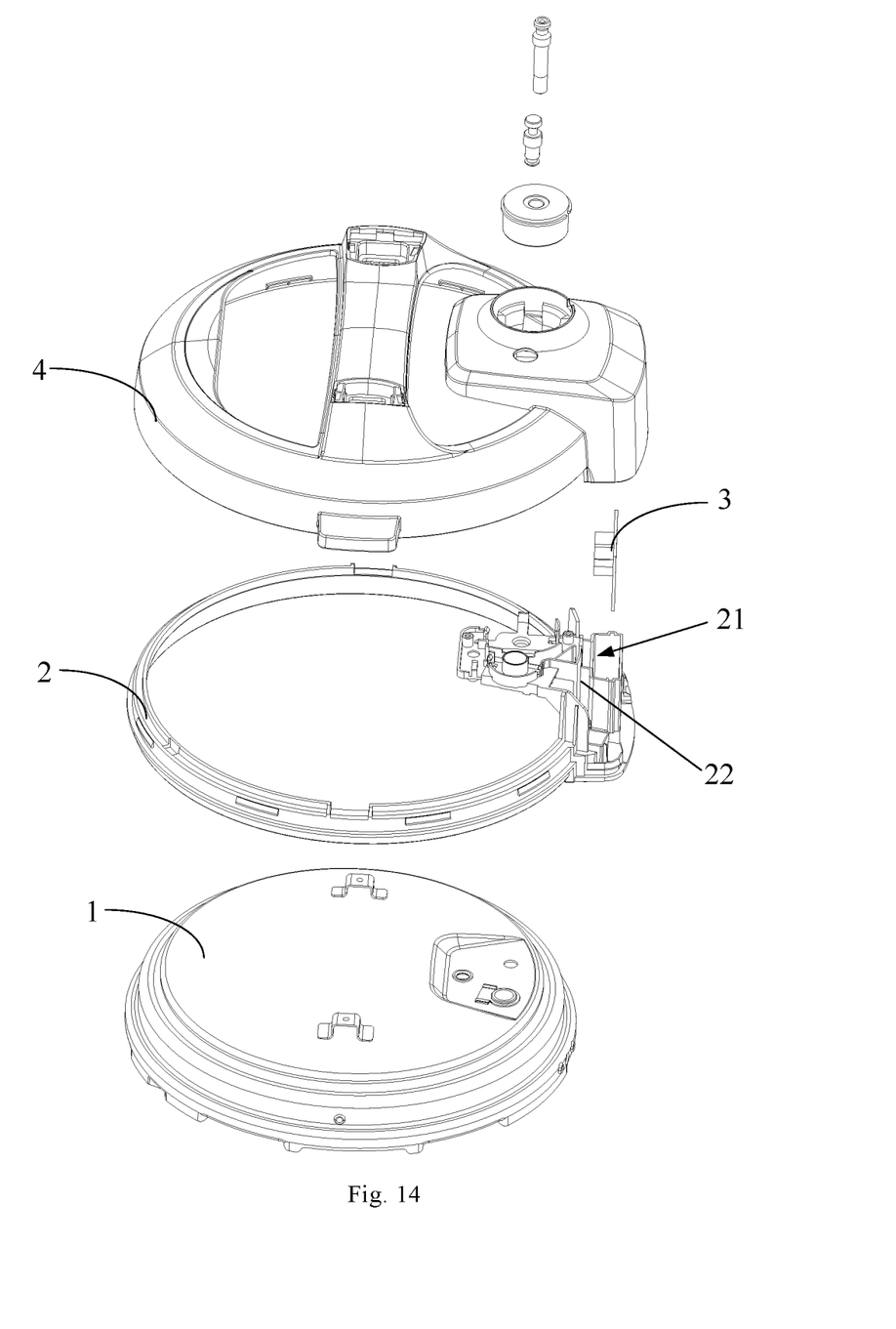
FIG. 14 is an exploded view of the lid body shown in FIG. 7.

The corresponding relationship between the reference signs and component names in FIGS. 1-14 is as follows:

1 pot lid, 2 inner lid, 21 mounting cavity, 211 guide groove, 22 protruding portion, 3 circuit board, 31 component having a relatively low temperature resistance, 32 component having a relatively high temperature resistance, 4 surface lid, 41 receiving cavity, and 411 stopping rib.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

An embodiment of the first aspect of the present disclosure provides a lid body, wherein the lid body is provided with a lid body wireless transmission device, the lid body wireless transmission device comprises a circuit board, the lid body is provided with a mounting cavity for mounting the circuit board, and has an opening on one side of the mounting cavity, the circuit board is fixedly mounted in the mounting cavity, and the mounting cavity is potted by means of a potting adhesive and the opening is sealed.

In the solution, the circuit board is potted in the mounting cavity by means of the potting adhesive, so that the circuit board is completely isolated from a cavity in the lid body to ensure that the circuit board does not contact high-temperature steam in the lid body, thereby preventing the occurrence of excessive temperature rise of a component due to that the circuit board contacts high-temperature steam or the occurrence of damages to the circuit board.

According to one embodiment of the present disclosure, as shown in FIGS. 1-6, the lid body comprises a pot lid 1 and an inner lid 2, the pot lid 1 comprises a top wall 35 and a side wall 37, the top wall 35 of the pot lid 1 is provided with mounting holes for mounting an exhaust valve and a float, the inner lid 2 is a substantially ring-shaped and is sleeved on the outer side of the side wall of the pot lid 1, the inner lid 2 is provided with a mounting cavity 21 for mounting a circuit board 3, so that the mounting cavity 21 is located at the side portion of the pot lid 1, the circuit board 3 is fixedly mounted in the mounting cavity 21, and the mounting cavity 21 is potted by means of a potting adhesive 33, to ensure that the circuit board 3 does not contact high-temperature steam in the lid body, thereby preventing the occurrence of excessive temperature rise of a component due to that the circuit board 3 contacts high-temperature steam or the occurrence of damages to the circuit board 3. Since the density of hot air is lower than the density of cold air, when steam leaks from the exhaust valve position and the float position, high-temperature steam will rise, and by providing the mounting cavity 21 at the side portion of the pot lid 1, it is possible to reduce the amount of steam in contact with the cavity wall of the mounting cavity 21 and the contact time, thereby reducing the temperature rise of the circuit board 3 within the mounting cavity 21.

In general, the lid body further comprises a surface lid, the surface lid also comprises a top wall 35 and a side wall 37, the bottom end of the side wall 37 of the surface lid is fixedly connected with the inner lid 2 to cover the pot lid 1 inside, so that a cavity is formed between the surface lid and the pot lid 1, and when steam leakage occurs at the exhaust valve position and float position, the high-temperature steam will accumulate at the top of the cavity. In this solution, the mounting cavity 21 is vertically arranged, and the circuit board 3 is vertically mounted in the mounting cavity 21. The top cavity wall of the mounting cavity 21 is in contact with more steam and the contact time is longer, resulting in a higher temperature rise at the top of the circuit board 3 than at the bottom of the circuit board 3. Therefore, at the time of mounting the components, the component 31 having a relatively low temperature resistance is mounted close to the bottom of the circuit board 3, and the component 32 having a relatively high temperature resistance is mounted above the component 31 having a relatively low temperature resistance, thereby reducing the temperature rise of the component 31 having a relatively low temperature resistance, and preventing excessive temperature rise of the component 31 having a relatively low temperature resistance.

In the above-described embodiment, optionally, the top end of the mounting cavity 21 has an opening. This design facilitates the potting operation.

In the above-described embodiment, optionally, at least one guide groove 211 is provided in the mounting cavity 21, and the guide rib is arranged vertically. At the time of mounting the circuit board 3, the edge of the circuit board 3 is inserted into the guide groove 211, and then the circuit board 3 is pushed along the guide groove 211 to slide the circuit board 3 into the mounting cavity 21. During the mounting process, the guide groove 211 guides the circuit board 3 to reduce the mounting difficulty of the circuit board 3, and after the circuit board 3 is mounted in place, the guide groove 211 fixes the circuit board 3 to prevent displacement of the circuit board 3 during the potting process.

In the above, optionally, two guide grooves 211 are provided opposite to each other in the mounting cavity 21, and two side edges of the circuit board 3 are mated with the two guide grooves 211, respectively. The guide grooves 211 designed in this manner will have good guiding and fixing effects on the circuit board 3.

In the above-described embodiment, optionally, the potting adhesive may be a two-liquid mixed hardening electronic potting adhesive.

In the above-described embodiment, optionally, the circuit board 3 is mounted in the mounting cavity 21, and the minimum distance between the highest end surface of the circuit board and an upper end surface of the mounting cavity 21 is 3 mm.

If the potting adhesive 33 at the opening position of the mounting cavity 21 is too thin, the sealing property of the mounting cavity 21 will be affected, and for this reason, in this solution, the top end of the circuit board 3 is made to be at least 3 mm lower than the top end of the mounting cavity 21, so that a potting adhesive 33 layer having a thickness of at least 3 mm is formed at the opening position of the mounting cavity 21, so as to effectively seal the mounting cavity 21.

As shown in FIGS. 7-14, in another embodiment of the first aspect of the present disclosure, the lid body is provided with a lid body wireless transmission device, the lid body wireless transmission device comprises a circuit board 3, the lid body is provided with a mounting cavity 21 for mounting the circuit board 3, the circuit board 3 is hermetically mounted in the mounting cavity 21, a receiving cavity 41 with an opening facing downward is provided on a lower surface of a top wall of the lid body, the opening of the receiving cavity 41 is lower than the lower surface of the top wall of the lid body, and the mounting cavity 21 is wholly or partially inserted into the receiving cavity 41.

In the solution, a receiving cavity 41 with an opening facing downward is provided on the lower surface of the top wall of the lid body, an exhaust valve and a float on the lid body are mounted outside the receiving cavity 41, and the mounting cavity 21 in which the circuit board 3 is mounted is at least partially inserted into the receiving cavity 41. When air leakage occurs at the position of the exhaust valve and the float, high-temperature steam will rise and accumulate below the top wall of the lid body, since the opening of the receiving cavity 41 is lower than the lower surface of the top wall of the lid body, the high-temperature steam cannot flow laterally into the receiving cavity 41, and only the air having a relatively low temperature at the bottom of the lid body can enter the interior of the receiving cavity 41 from the opening at the bottom of the receiving cavity 41, and come into contact with the mounting cavity 21, which can reduce the temperature rise of the mounting cavity 21, thus reducing the temperature rise of the circuit board 3 in the mounting cavity 21 and preventing excessive temperature rise of the components on the circuit board 3.

In the above-described embodiment, optionally, the lid body comprises a pot lid 1 and a surface lid 4, the surface lid 4 comprises a surface lid 4 top wall and a surface lid 4 side wall extending downwardly from an edge of the surface lid 4 top wall, the surface lid 4 covers the pot lid 1 inside, the surface lid 4 top wall is provided with a stopping rib 411 extending downwardly, and two sides of the stopping rib 411 are respectively connected with the surface lid 4 side wall, so that the receiving cavity 41 is formed between the stopping rib 411 and the surface lid 4 side wall.

In the solution, the lower surface of the surface lid 4 top wall is provided with a stopping rib 411, and the two sides of the stopping rib 411 are connected with the surface lid 4 side wall to form the receiving cavity 41. When air leakage occurs at the position of the exhaust valve and the float, high-temperature steam will accumulate below the surface lid 4 top wall, due to the blocking of the stopping rib 411, the high-temperature steam cannot flow laterally into the receiving cavity 41, and only the air having a relatively low temperature at the bottom of the lid body can enter the interior of the receiving cavity 41 from the opening at the bottom of the receiving cavity 41, and come into contact with the mounting cavity 21, which can reduce the temperature rise of the mounting cavity 21, thus reducing the temperature rise of the circuit board 3 in the mounting cavity 21 and preventing excessive temperature rise of the components on the circuit board 3.

Optionally, the lid body further comprises an inner lid 2, the mounting cavity 21 is provided on the inner lid 2, the pot lid 1 comprises a pot lid 1 top wall and a pot lid 1 side wall extending downwardly from an edge of the pot lid 1 top wall, the inner lid 2 is sleeved on an outer side of the pot lid 1 side wall, the surface lid 4 side wall is fixedly connected to the inner lid 2, and the surface lid 4 covers the pot lid 1 and the inner lid 2 inside.

In the solution, the mounting cavity 21 is provided on the inner lid 2, and the circuit board 3 is hermetically mounted in the mounting cavity 21 of the inner lid 2, and the design of inserting the inner lid 2 mounting cavity 21 into the surface lid 4 receiving cavity 41 reduces the temperature of the mounting cavity 21, thereby reducing the temperature rise of the circuit board 3 in the mounting cavity 21, and preventing excessive temperature rise of the components on the circuit board 3.

Optionally, the lid body further comprises a mounting box, the mounting cavity is provided in the mounting box, and the mounting box is fixedly mounted between the surface lid and the pot lid.

In the solution, a separate part, i.e., the mounting box, is designed for mounting the circuit board, the circuit board is hermetically mounted in the inner lid mounting box, and the design of inserting the mounting box into the surface lid receiving cavity reduces the temperature of the mounting cavity, thereby reducing the temperature rise of the circuit board in the mounting cavity, and preventing excessive temperature rise of the components on the circuit board.

In the above-described embodiment, optionally, the mounting cavity 21 comprises a protruding portion 22 protruding towards the center of the pot lid, and the receiving cavity 41 is provided with an opening corresponding to the protruding portion 22.

In the above-described embodiment, optionally, the circuit board 3 is vertically mounted in the mounting cavity 21.

In the above-described embodiment, optionally, a component 31 having a relatively low temperature resistance and a component 32 having a relatively high temperature resistance are mounted on the circuit board 3, and the component 32 having a relatively high temperature resistance is mounted above the component 31 having a relatively low temperature resistance.

In the solution, the circuit board 3 is vertically mounted in the mounting cavity 21, since the density of hot air is lower than the density of cold air, when steam leaks from the exhaust valve position and the float position, high-temperature steam will rise, more steam comes into contact with the top cavity wall of the mounting cavity 21 and the contact time is longer, resulting in a higher temperature rise at the top of the circuit board 3 than at the bottom of the circuit board 3. Therefore, at the time of mounting the components, the component 31 having a relatively low temperature resistance is mounted close to the bottom of the circuit board 3, and the component 32 having a relatively high temperature resistance is mounted above the component 31 having a relatively low temperature resistance, thereby reducing the temperature rise of the component 31 having a relatively low temperature resistance, and preventing excessive temperature rise of the component 31 having a relatively low temperature resistance.

In the above-described embodiment, optionally, the mounting cavity 21 is provided at a side portion of the lid body.

Since the density of hot air is lower than the density of cold air, when steam leaks from the exhaust valve position and the float position, high-temperature steam will rise, and by providing the mounting cavity 21 at the side portion of the lid body, it is possible to reduce the amount of steam in contact with the cavity wall of the mounting cavity 21 and the contact time, thereby reducing the temperature rise of the circuit board 3 within the mounting cavity 21.

In the above-described embodiment, optionally, at least one guide groove is provided in the mounting cavity 21, and an edge of the circuit board 3 is mated with the guide groove.

At the time of mounting the circuit board 3, the edge of the circuit board 3 is inserted into the guide groove, and then the circuit board 3 is pushed along the guide groove to slide the circuit board 3 into the mounting cavity 21. During the mounting process, the guide groove guides the circuit board 3 to reduce the mounting difficulty of the circuit board 3, and after the circuit board 3 is mounted in place, the guide groove fixes the circuit board 3 to prevent the circuit board 3 from moving in the mounting cavity.

In the above, optionally, two guide grooves are provided opposite to each other in the mounting cavity 21, and two side edges of the circuit board 3 are mated with the two guide grooves, respectively. The guide grooves designed in this manner will have good guiding and fixing effects on the circuit board 3.

An embodiment of the second aspect of the present disclosure provides a cooker, comprising a lid body as provided in any of the embodiments of the present disclosure and a pot body used in cooperation cooperatively with the lid body.

The cooker provided by an embodiment of the second aspect of the present disclosure comprises the lid body provided by any of the embodiments of the first aspect of the present disclosure, and therefore the cooker has all the beneficial effects of the lid body provided by any of the above-described embodiments, which will not be further described here.

Specifically, the cooker includes a split-type electric pressure cooker, a split-type pressure electric rice cooker, etc.

In spite of appended claims, the present disclosure is also defined by the following clauses:

1. A lid body, wherein the lid body is provided with a lid body wireless transmission device, the lid body wireless transmission device comprises a circuit board, the lid body is provided with a mounting cavity for mounting the circuit board, and has an opening on one side of the mounting cavity, the circuit board is fixedly mounted in the mounting cavity, and the mounting cavity is potted by means of a potting adhesive and the opening is sealed.

2. The lid body according to clause 1, wherein the circuit board is vertically mounted in the mounting cavity.

3. The lid body according to clause 2, wherein a component having a relatively low temperature resistance and a component having a relatively high temperature resistance are mounted on the circuit board, and the component having a relatively high temperature resistance is mounted above the component having a relatively low temperature resistance.

4. The lid body according to clause 1, wherein the top end of the mounting cavity has an opening.

5. The lid body according to clause 1, wherein the mounting cavity is provided at a side portion of the lid body.

6. The lid body according to clause 1, wherein at least one guide groove is provided in the mounting cavity, and an edge of the circuit board is mated with the guide groove.

7. The lid body according to clause 1, wherein the potting adhesive includes a two-liquid mixed hardening potting adhesive.

8. The lid body according to any of clauses 1-7, wherein the lid body comprises a pot lid, an inner lid and a surface lid, the inner lid is mounted on an outer side of the pot lid, the surface lid is mounted on an outer side of the inner lid, and the mounting cavity is provided on the inner lid.

9. The lid body according to any of clauses 1-7, wherein the circuit board is mounted in the mounting cavity, and the minimum distance between the highest end surface of the circuit board and an upper end surface of the mounting cavity is 3 mm.

10. A cooker, comprising the lid body according to any of clauses 1-9 and a pot body used in cooperation with the lid body.

11. A lid body, wherein the lid body is provided with a lid body wireless transmission device, the lid body wireless transmission device comprises a circuit board, the lid body is provided with a mounting cavity for mounting the circuit board, the circuit board is hermetically mounted in the mounting cavity, a receiving cavity with an opening facing downward is provided on a lower surface of a top wall of the lid body, the opening of the receiving cavity is lower than the lower surface of the top wall of the lid body, and the mounting cavity is wholly or partially inserted into the receiving cavity.

12. The lid body according to clause 11, wherein the lid body comprises a pot lid and a surface lid, the surface lid comprises a surface lid top wall and a surface lid side wall extending downwardly from an edge of the surface lid top wall, the surface lid covers the pot lid inside, the surface lid top wall is provided with a stopping rib extending downwardly, and two sides of the stopping rib are respectively connected with the surface lid side wall, so that the receiving cavity is formed between the stopping rib and the surface lid side wall.

13. The lid body according to clause 12, wherein the lid body further comprises an inner lid, the mounting cavity is provided on the inner lid, the pot lid comprises a pot lid top wall and a pot lid side wall extending downwardly from an edge of the pot lid top wall, the inner lid is sleeved on an outer side of the pot lid side wall, the surface lid side wall is fixedly connected to the inner lid, and the surface lid covers the pot lid and the inner lid inside.

14. The lid body according to clause 12, wherein the lid body further comprises a mounting box, the mounting cavity is provided in the mounting box, and the mounting box is fixedly mounted between the surface lid and the pot lid.

15. The lid body according to clause 12, wherein the mounting cavity comprises a protruding portion protruding towards the center of the pot lid, and the receiving cavity is provided with an opening corresponding to the protruding portion.

16. The lid body according to any of clauses 11-15, wherein the circuit board is vertically mounted in the mounting cavity.

17. The lid body according to clause 16, wherein a component having a relatively low temperature resistance and a component having a relatively high temperature resistance are mounted on the circuit board, and the component having a relatively high temperature resistance is mounted above the component having a relatively low temperature resistance.

18. The lid body according to any of clauses 11-15, wherein the mounting cavity is provided at a side portion of the lid body.

19. The lid body according to any of clauses 11-15, wherein at least one guide groove is provided in the mounting cavity, and an edge of the circuit board is mated with the guide groove.

20. A cooker, comprising the lid body according to any of clauses 11-19 and a pot body used in cooperation with the lid body, the pot body being provided with a pot body wireless transmission device communicating with the lid body wireless transmission device.

In the description of the present disclosure, the orientation or position relationships indicated by the terms "upper", "lower", "top", "bottom" and the like are the orientation or position relationships based on what is shown in the drawings, are merely for the convenience of describing the present disclosure and simplifying the description, and do not indicate or imply that the device or element referred to must have a particular orientation and is constructed and operated in a specific orientation, and thus cannot be understood as the limitation of the present disclosure.

In the description of the present disclosure, the terms "connection", "mounting", "fixing" and the like should be understood in a broad sense. For example, "connection" may be a fixed connection, a removable connection or an integral connection; and may refer to direct connection and may also refer to indirect connection through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples. The terms "connection", "mounting", "fixing" and the like should be understood in a broad sense. For example, "connection" may be a fixed connection, a removable connection or an integral connection; and may refer to direct connection and may also refer to indirect connection through an intermediary. A person of ordinary skills in the art could understand the specific meaning of the terms in the present disclosure according to specific situations.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A lid assembly, comprising:
an outer lid or a surface lid;
a pot lid;
an inner lid; and
a circuit board for wireless transmission,
wherein the inner lid is provided with a mounting cavity for mounting the circuit board, and the inner lid has a sealed portion on a top side of the mounting cavity, the circuit board is fixedly mounted in the mounting cavity by means of the sealed portion or a potting adhesive provided on a top end of the circuit board, the circuit board is vertically mounted in the mounting cavity, a component of the circuit board having a relatively low temperature resistance and a component of the circuit board having a relatively high temperature resistance are mounted vertically on the circuit board, and the component having a relatively high temperature resistance is mounted vertically above the component having a relatively low temperature resistance, and
wherein the surface lid forming a receiving cavity with a bottom opening in a lower portion of the receiving cavity is provided on a lower surface of a top wall of the surface lid, the bottom opening of the receiving cavity is lower than the lower surface of the top wall of the surface lid, and the mounting cavity is wholly or partially inserted into the receiving cavity of the surface lid.

2. The lid assembly according to claim 1, wherein the surface lid further comprises a surface lid side wall extending downwardly from an edge of the top wall of the surface lid, the surface lid covers the pot lid inside, the top wall is provided with a stopping rib extending downwardly, and two sides of the stopping rib are respectively connected with the surface lid side wall, so that the receiving cavity is formed between the stopping rib and the surface lid side wall.

3. The lid assembly according to claim 2, wherein the pot lid comprises a pot lid top wall and a pot lid side wall extending downwardly from an edge of the pot lid top wall, the inner lid is sleeved on an outer side of the pot lid side wall, the surface lid side wall is fixedly connected with the inner lid, and the surface lid covers the pot lid and the inner lid inside.

4. The lid assembly according to claim 2, wherein the mounting cavity comprises a protruding portion protruding towards the center of the pot lid, and the receiving cavity is provided with an opening corresponding to the protruding portion.

5. The lid assembly according to claim 1, wherein the circuit board is mounted in the mounting cavity, and the minimum distance between the highest end surface of the circuit board and an upper end surface of the mounting cavity is 3 mm.

6. The lid assembly according to claim 1, wherein the mounting cavity is provided at a side portion of the inner lid.

7. The lid assembly according to claim 1, wherein at least one guide groove is provided in the mounting cavity, and an edge of the circuit board is mated with the guide groove.

8. The lid assembly according to claim 1, wherein the potting adhesive includes a two-liquid mixed hardening potting adhesive.

9. A cooker, comprising the lid assembly of claim 1 and a pot body used in cooperation with the lid assembly.

* * * * *